United States Patent [19]

Hall

[11] 3,921,585
[45] Nov. 25, 1975

[54] FOLDING TRAILER CORRAL

[76] Inventor: Mary Irene Hall, 10320 Sunland Blvd., Sunland, Calif. 91040

[22] Filed: May 10, 1974

[21] Appl. No.: 468,654

Related U.S. Application Data

[63] Continuation-in-part of Ser. No. 359,352, May 11, 1973, abandoned.

[52] U.S. Cl. ............... 119/20; 256/25; 296/24 C
[51] Int. Cl.[2] .................................. A01K 1/00
[58] Field of Search ........ 296/24 C, 61; 119/10, 20, 119/82; 256/23, 25, 26, 24; 49/396

[56] References Cited
UNITED STATES PATENTS

| 753,833 | 3/1904 | Copley | 296/61 X |
|---|---|---|---|
| 1,200,879 | 10/1916 | Harrison | 49/396 X |
| 2,835,223 | 5/1958 | Erickson | 119/20 |
| 2,895,716 | 7/1959 | Veltri | 256/23 |
| 3,053,224 | 9/1962 | Pierce | 296/24 C X |
| 3,204,606 | 9/1965 | Parr et al. | 119/20 |
| 3,726,256 | 4/1973 | Bernhardt et al. | 119/20 |
| 3,741,529 | 6/1973 | Blagg | 256/26 |
| 3,767,167 | 10/1973 | Rasmussen | 256/26 |

Primary Examiner—Robert J. Spar
Assistant Examiner—Leslie J. Paperner
Attorney, Agent, or Firm—Whann & McManigal

[57] ABSTRACT

An animal corral comprising two foldable units each having individual sections, the units being mounted on the opposite sides of an entrance-exit opening of a portable carrier, such as a horse trailer, the unit sections being compactly folded on each side of the trailer and being readily unfolded to form a corral area immediately adjacent the entrance-exit opening of the carrier.

7 Claims, 10 Drawing Figures

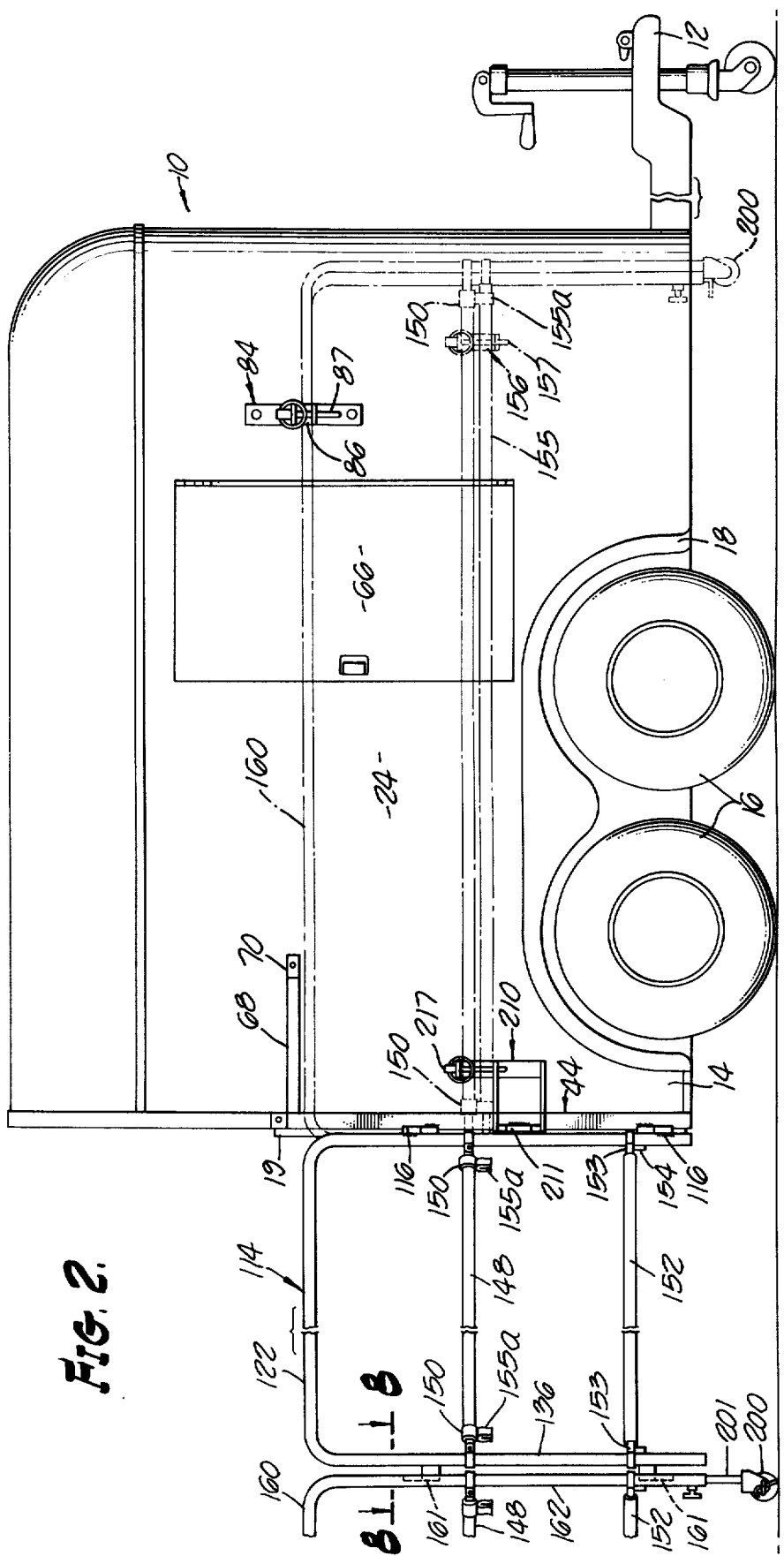

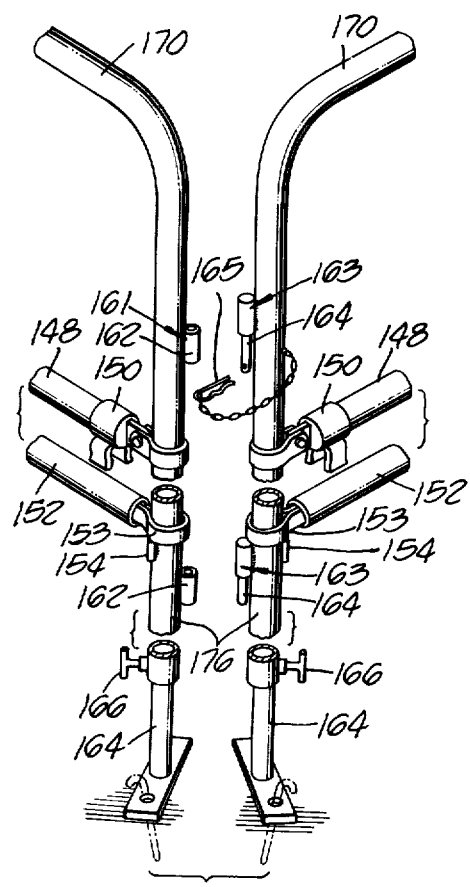
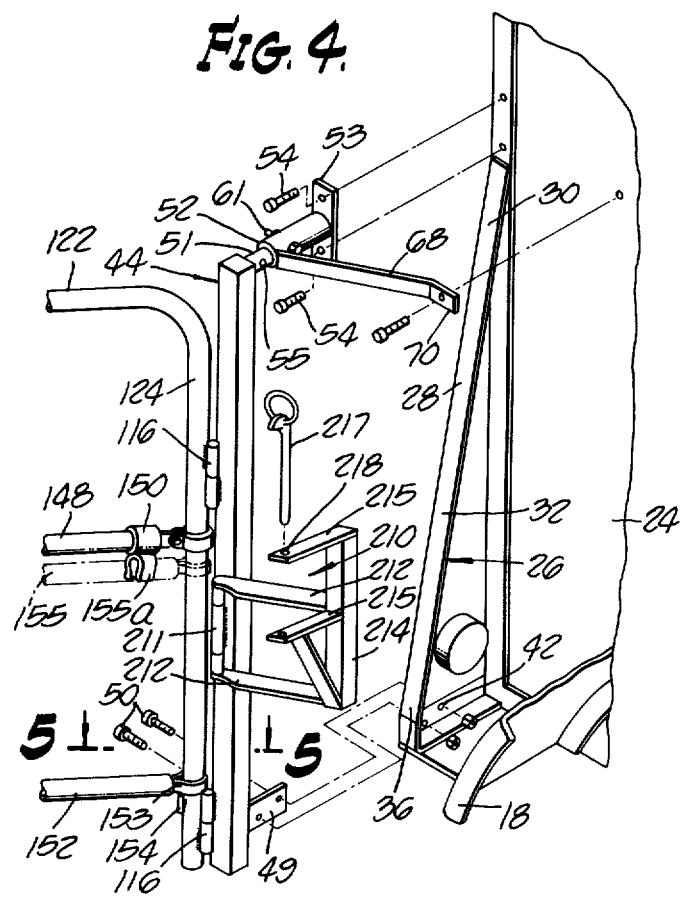
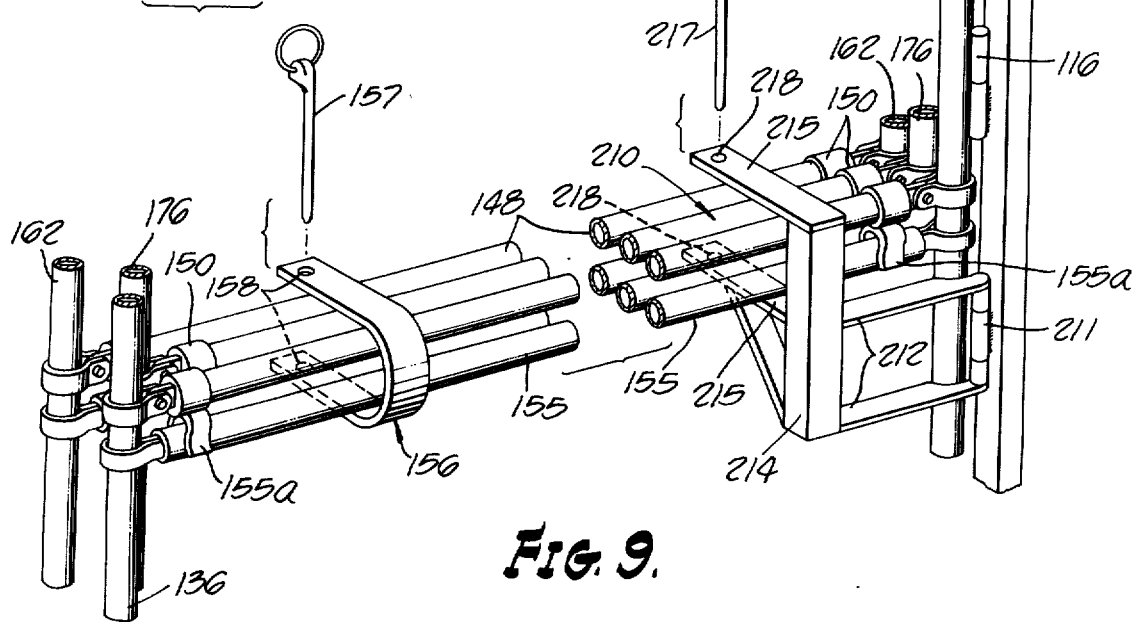

FOLDING TRAILER CORRAL

This application is a continuation-in-part of my co-pending application for U.S. Pat. Ser. No. 359,352, filed May 11, 1973, now abandoned.

BACKGROUND OF THE INVENTION

This invention relates to corrals and more particularly to a corral divided into two foldable units which may be attached to opposite sides of a vehicle, such as a horse trailer so that whenever desired during a trip or at a destination the corral parts may be unfolded and an area provided for the horse.

Enclosures for animals are well known, and enclosures consisting of a plurality of sections joined together are contained in the prior art. The closest prior art with which applicant is familiar is contained in the following patents:

| | |
|---|---|
| Nelson | 478,706 |
| Copley | 753,833 |
| Tracy | 1,371,950 |
| Crivella | 2,621,070 |
| Erickson | 2,835,223 |
| Galamba | 3,002,493 |
| Parr, et al. | 3,204,606 |
| Bernhardt, et al. | 3,726,256 |

In the U.S. patent to Bernhardt et al., No. 3,726,256, filed July 12, 1971, a demounted horse corral and trailer structure is shown. This patent, however, does not disclose the idea of a corral comprising two units with a plurality of sections, which are compactly folded forwardly on their pivots along the side walls of the vehicle where they are positioned while the vehicle is being transported from place to place, and which are swingable rearwardly on their pivots from a folded position on the sides of the vehicle to an extended position, to the rear of the animal trailer or vehicle where both units cooperate to provide the corral rearwardly to the trailer structure.

SUMMARY OF THE INVENTION

It is an object of the present invention to provide a combination vehicle and corral in which a corral is mounted on a vehicle or trailer and conveniently and compactly carried along with the portable vehicle and whenever desired to be unfolded in order to form an ample corral for one or two horses. The corral of applicant's invention is safe and practical. It does not affect roadability of the vehicle and enables the person travelling with his horse or horses to at any time stop, set-up the corral and allow the horse or horses some relaxation from their being maintained in a relatively small space of the horse trailer for many hours' time.

An advantage of the invention is that the horse owner, by the use of this foldable corral, can keep his horses away from unclean stalls, which may contain harmful germs and bacteria and protect the horses from diseases or cuts or rope burns. As an example of the size of the corral, one having three foldable sections in each of the two units will form a complete enclosure of approximately 300 square feet.

It is a further object of the invention to provide a foldable corral which may be very simply and rapidly unfolded from its compact position on the side of the vehicle to form the corral.

Another object of the invention is to provide the sections of each corral unit with lower bars which may be moved into raised positions so that the sections may be folded against the sides of the vehicle, the raising of the lower bars to a higher elevation allowing the sections to move over the wheel wells or fenders.

Many horse trailers or vehicles include side doors whereby access may be had for checking the horse, the lead line or for feeding. It is an object of the present invention to provide the foldable sections which may be detachably secured into a compact arrangement and the entire unit swung outwardly around a pivot at the rear end of the vehicle to give ready access to the side doors.

It is a still further object of the invention to provide a foldable corral of the type disclosed having adjustable feet or supports so that the sections of the corral may extend over uneven ground, the feet being adjusted to properly support the sections.

It is also an object of the invention to provide at least certain of the sections with wheels so that they may be readily rolled over the supporting surface, these wheels being adjustable in height and including means for securing the corral sections in the desired locations.

It is a still further object of the invention to provide a side mounting bracket which is adjustable so that the corral units may be mounted on various vehicles which may have different sizes, shapes or contours.

It is a still further object of the invention to provide a unique bracket arrangement whereby the sections of each unit may be readily detachably secured together so that the sections may move as a unit to give access to a side door of the vehicle.

Other objects, features and advantages of the invention will be made evident during the course of the following detailed description of the invention.

BRIEF DESCRIPTION OF THE DRAWINGS

FIG. 2 is a side elevational view of a horse trailer showing applicant's invention and more particularly showing a part of one of the foldable units mounted on the vehicle and in dotted lines showing the manner in which the corral unit may be folded against the side of the vehicle;

FIG. 3 is a top plan view of one unit of applicant's portable corral illustrating the unit folded against the side of the vehicle;

FIG. 4 is a perspective view, partly exploded, of a mounting bracket of applicant's invention by means of which each unit may be mounted at the rear end of a vehicle;

FIG. 7 shows the manner in which the two end sections of each unit may be connected together;

FIG. 9 is a fragmentary perspective view showing a hinged bracket whereby the three sections of a unit may be held together in folded position so as to be swingable as a unit around the hinge means whereby the units are pivotally connected to the side mounting brackets.

DESCRIPTION OF THE PREFERRED EMBODIMENTS

Figure 1:
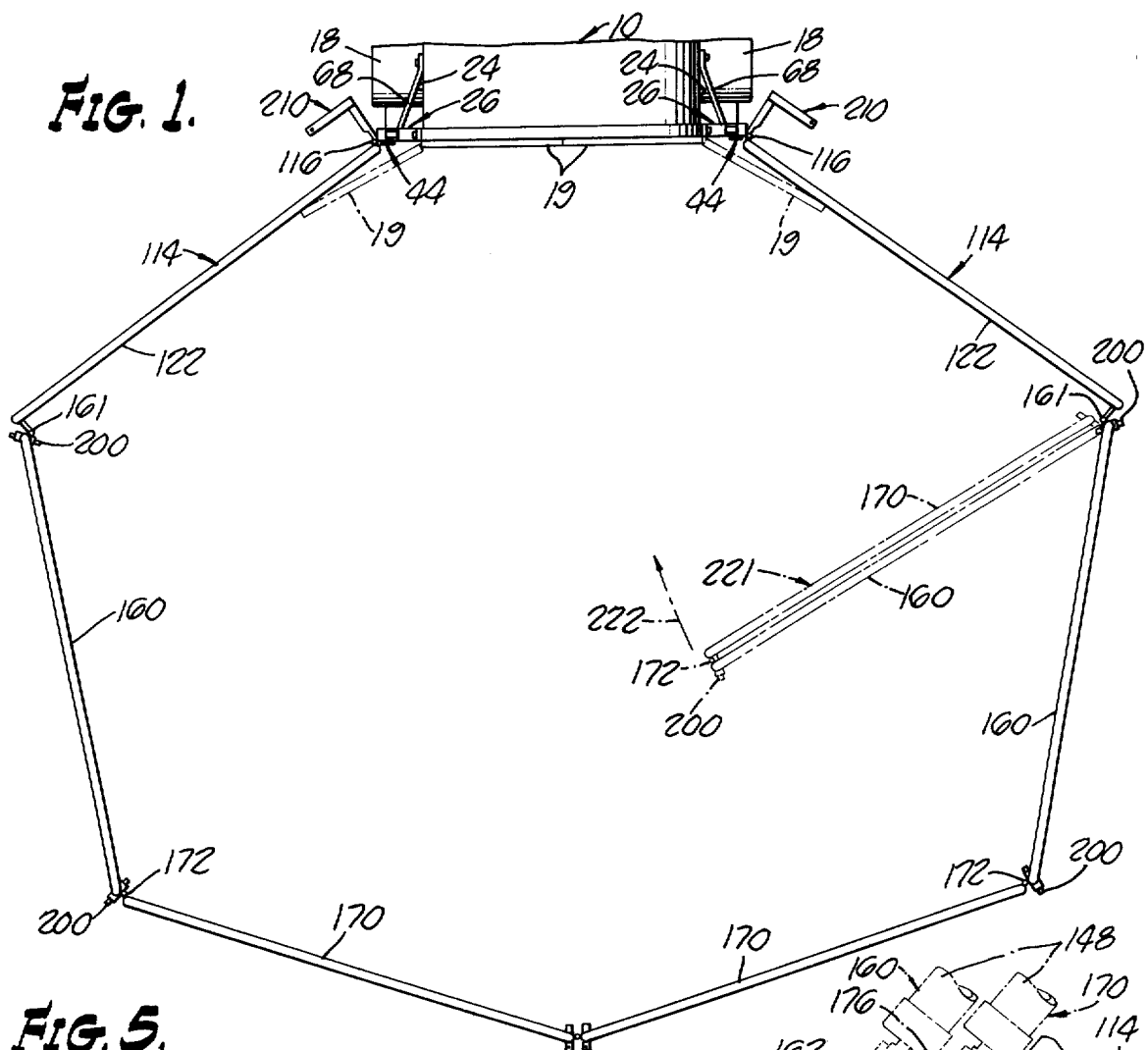
FIG. 1 is a plan view of applicant's invention showing the rear end of a vehicle with the sections of each foldable unit unfolded to provide a corral.

Referring to the drawings, the horse trailer or other portable carrier is designated by the numeral 10 and has a front end 12 adapted for being independently supported and also being connected to a towing vehicle. The trailer also has rear end 14 and one or more wheels 16 contained in wheel wells 18 and surrounded at the top parts by fenders, as shown.

The trailer 10 has a back wall having an opening therein which may be closed by doors 19, as shown in FIG. 1, the opening serving as a means for ingress and egress of the horse or horses.

Applicant's invention consists of two corral-forming units, each having a plurality of sections. Each unit can be identical to the other unit, except that one may be right-hand and the other may be left-hand, and except that where the two units are connected together, complementary locking parts will be provided.

There is a pair of brackets generally designated by the numeral 26. There is one bracket mounted on one side of the vehicle and a second bracket is mounted on the opposite side of the vehicle, said parts being positioned near the rear ends of the sides 24 of the vehicle.

One of the mounting brackets will be described and it is to be understood that this description applies to the second mounting bracket. The mounting attachment may vary slightly to suit the particular vehicle on which it is installed. The vehicle usually includes an inclined strip 28 having an upper end 30 connected to the side wall of the vehicle. An intermediate portion 32 of the bracket 26 has a spacer 34 and the lower portion 36 has a lower angle member which supports the lower end of the diagonal bar 28.

Adapted to be connected to the bracket 26 is a substantially vertical mounting structure or bracket 44 having a vertical leg 46 which is rectangular in cross-section. The lower portion of the vertical leg 46 has a flange 49 for accommodating bolts 50 which hold the lower end of the mount 44 to the attachment 26, the bolts 50 extending through the openings 42.

The upper end of the mount 44 has an adjustable connecting means which comprises a horizontally extending cylindrical bar 51, which is slidable within a tube 52 mounted by a plate 53 to the side of the trailer, bolts 54 being used for this purpose. Both the bar 51 and the tube 52 have openings 55 to accommodate bolt 61. Proper openings may be selected so that the mount 44 will be in a vertical position.

The outer end of tube 52 has a diagonal brace 68 secured to the vehicle at 70, to assist in holding the tube 52 against movement.

Mounted on the side 24 of the vehicle near its forward end, and forward of the access door 66, is a fixture 84 having a pair of outwardly extending bars 85 open at their outer ends and defining a horizontal receiving space 86 for receiving portions of the foldable sections, as will be later described. There is a removable pin 87 which closes the outer end of the space 86.

The corral shown in the drawings is provided in the form of two separate units, one of which is connected to one of the mounting brackets, and the other of which is connected to the other of the mounting brackets. Each unit includes a plurality of fence sections hingedly connected together. The sections connected to the mounting brackets are designated by the numeral 114.

Section 114 identified as a first section includes an inverted "U" shaped hollow tubular member 122 which is generally level on top and rounded at the corners. Member 122 has an upright first leg 124 which is hingedly connected to bar 44 by hinges 116. Section 114 also has a second leg 136, and extending horizontally between the two legs is a horizontal bar 148 which is supported in place by clamping members 150.

The first section 114 has a second bar 152, which has rings 153 surrounding the legs 124 and 136. Secured to each of the legs is a stop 154, which determines the lowest position of the bar 152. As shown in FIGS. 4 and 9, the bar 152 may be moved from a lowered position to a raised position as indicated by dotted lines 155, and may be temporarily held in this position by spring clips 155a.

Each unit also has an intermediate section 160 which is of the same general shape as the first section 114. The units 114 and 160 are connected together by hinges 161.

Figure 5:
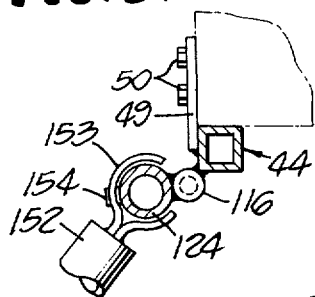
FIG. 5 is a cross-sectional view taken along the line 5—5 of FIG. 4 showing the manner in which a section of applicant's corral is pivotally connected to the mounting bracket.
Figure 8:
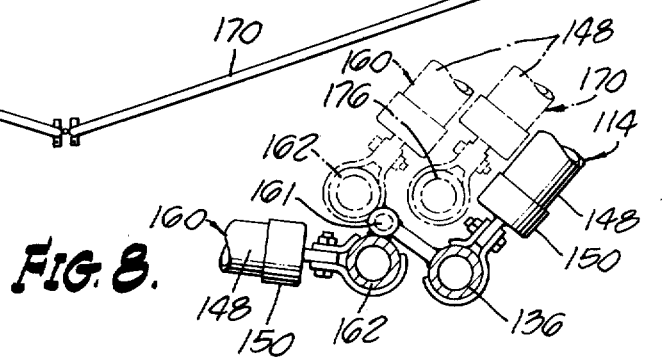
FIG. 8 is a fragmentary sectional view taken along the line 8—8 of FIG. 2 showing the hinging arrangement which permits the sections of each unit to be compactly folded.

FIG. 5 is a sectional view showing the hinging arrangement at the bracket, and FIG. 8 is a view showing the hinging arrangement between sections 114 and 160. It will be noted that the hinges 161 are in an eccentric position so that the section 160, when in folded position, may fold against the section 114 with section 170 in an intermediate position.

The legs of section 114, 160 and 170 may have adjustable leg portions 164, which extend into the legs 162, which are hollow, the height of the additional leg 164 being adjustable to a desired position and then held in place by tightening the locking screw 166. Also, if desired, casters 200 may be used as desired.

Each of the units has an end section 170 attached to an intermediate section 160 by means of hinges 172. The end sections 170 resemble the intermediate sections 160 and each of these two sections has horizontal bars 148 and the lower bars 152, which engage stops 154 for their lower positions and may be moved upwardly into raised positions as shown by dotted lines 155 in FIGS. 2 and 4.

Each of the end sections have legs 176 which, when the parts are unfolded and in the position shown in FIG. 1, are adjacent to each other, as shown in FIG. 7.

As shown best in the expanded view, FIG. 7, the sections 170 are releasably secured together by hinges 161. Each hinge includes a lower hinge element 162 mounted on one section, and a hinge element 163 mounted on the other of the sections. Extending downwardly from the hinge element 163 is a hinge pin 164. The sections can be readily hinged together by placing the parts in such a position that the hinge element 163 is spaced above the hinge element 162. The upper section is then lowered so that the pin 164 enters the opening of the hinge element 162 and a cotter pin 165 may then be installed in place.

Figure 10:
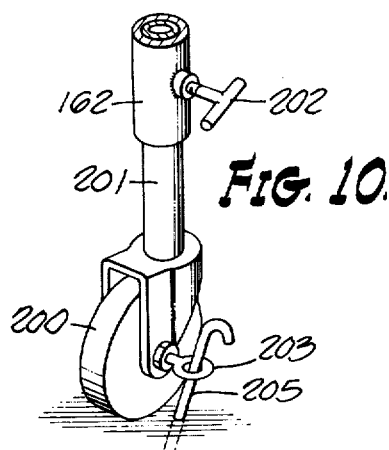
FIG. 10 is a perspective view showing the manner in which rollers may be provided for the different sections.

The end members of the sections under discussion may have adjustable lower portions or feet 164 as shown in FIG. 2, or may be provided with the casters 200, as shown in FIG. 10, mounted on leg extentions 201 which extend into end members and are locked in place by the lock element 202 so that the sections 170 may be very easily moved between folded and unfolded positions. The pivot pin for the wheels of the casters has an eye 203 to receive a locking pin 205, which may be shoved into the ground to hold the leg in a fixed position.

The parts of the corral may be folded by first disconnecting the latching arrangement, as shown in FIG. 7, and then folding the sections 170 against the sections 16 of each unit as shown by dotted lines 221 of FIG. 1. Thereafter the two sections may be swung in the direction of arrow 222, so that the parts fold together as shown in FIG. 8. Either before or after folding, the lower bars 152 may be raised into position 155. When the sections are folded and the bars raised, the ends of the bars, as well as the ends of the three sections adjacent to the mounting bracket, may be secured together by means of a securing bracket arrangement shown best in FIGS. 4 and 9. Securing bracket 210 is hinged to the vertical bar 44 by a hinge 211, which is in axial alignment with the hinges 116. The bracket 210 has horizontal bars 212 to the ends of which there is connected a vertical bar 214. The vertical bar 214 has a pair of horizontal arms 215. When the parts have been folded as previously explained the bracket 210 is moved in a clockwise direction from the position shown in FIG. 4 into the position shown in FIG. 9. At this time the bars 148 and 152 of the three sections are enclosed between the upper and lower arms 215, whereafter a lock pin 217 is inserted through the openings 218 at the ends of the arms and the bars are thereupon secured within the space between the arms 215. Also, the "U" shaped bracket 156 is placed as shown in FIG. 9 and the key 157 extended through openings 158.

Each unit is then swung in a direction to move the compact assembly along the sides of the vehicle, as shown in full lines in FIG. 3, and in dotted lines in FIG. 2. It will be noted that the bars 152 being elevated pass over the wheel wells or fenders 18, and, therefore, may fit relatively close to the vehicle in a convenient position.

Figure 6:
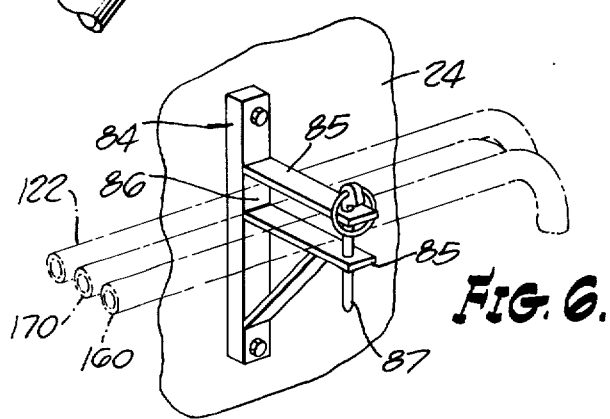
FIG. 6 is a perspective view showing a holding bracket positioned near the forward end of the side of the vehicle whereby the forward end of the folded unit may be removably attached to the vehicle.

When the parts are compacted against the sides of the vehicle the upper bars of each section are received in the space 86 and the lock pin 87 is then installed in place, as shown in FIG. 6.

The parts, when in the position just described and as best shown in FIG. 2, extend across the door 66. If it is desired to gain access to the door 66 this can be conveniently done by removing the pin 87 and swinging the folded sections outwardly around the rearward hinges 116 to give ample space to get to the door 66 and open it.

From the foregoing it will be readily appreciated that the corral of applicant's invention can be made of lightweight tubing so that they are easy to move into their various positions with a minimum of physical effort.

The two units need not widen the vehicle any appreciable amount because except for the rearward ends of the folded sections they are within the width of the wheel wells or fenders.

The folding and unfolding can be done in a minimum of time. Whenever it is desired to stop the vehicle and give the horse or horses being carried thereby rest and exercise, the corral may be unfolded in a few simple steps. First, the pins 87 are withdrawn from both of the fixtures 86, and the two units swung so that they extend in substantially the rearwardly angled positions of the sections 114, as shown in FIG. 1. Then the pins 217 are removed and the brackets 210 swung out of the way. Also, brackets 156 are removed to enable lowering of the lower cross bars to full line position. After this is done the two remaining sections can be swung rearwardly, as shown by dotted lines 221 in FIG. 1, until the second sections 160 reach full line position, whereafter the third sections 170 of each unit is swung into the positions shown in FIG. 1 and the sections connected together.

I claim:

1. In a combination of the class described:
   a. a vehicle adapted to carry animals and having an ingress and egress opening;
   b. mounting brackets secured to said vehicle on opposite sides of said opening;
   c. two foldable corral-forming units, one pivoted to one of said mounting brackets on each side of said opening, each of said units having a plurality of fence sections hingedly connected together and adapted to fold along the side walls of said vehicle, said fence sections also being adapted to be unfolded in order to form a corral area adjacent said vehicle and connected to said opening of said vehicle; and
   d. a securing bracket pivotally mounted on at least one of said mounting brackets, the pivot of said securing bracket being in substantial alignment with the pivots of said foldable units, said securing bracket being movable into a position encompassing portions of one of said foldable units when they are in folded position to secure the sections of said unit so that said sections will all pivot together, said folded sections and said securing bracket thereafter being swingable on a common pivot.

2. A combination as defined in claim 1 in which the vehicle has wheel wells or fenders extending outwardly from the body of the vehicle and in which the sections of the corral-forming units have lower bars which may be moved upwardly so that said folded corral-forming units may swing into a position adjacent the side walls of said vehicle and said bars will be in a position above said wheel wells or fenders.

3. In a combination of the class described:
   a. a vehicle adapted to carry animals and having an ingress and egress opening and wheel wells on each side thereof; and
   b. two foldable corral-forming units, one pivoted on each side of said opening, each of said units having a plurality of fence sections hingedly connected together and adapted to fold along the side walls of said vehicle, said fence sections also being adapted to be unfolded in order to form a corral area adjacent said vehicle and connected to said opening of said vehicle, the sections of said foldable corral units having a lower bar which may be moved to a raised position relative to said section so that when said units are in folded position the sections will clear said wheel wells without said units being raised as a whole.

4. In a combination of the class described:
   a. a vehicle adapted to carry animals and having an ingress and egress opening in the rear wall thereof and an access door in a side wall thereof;
   b. two foldable corral-forming units, one pivoted on each side of said opening, each of said units having a plurality of fence sections hingedly connected together and adapted to fold along the side walls of said vehicle, said fence sections also being adapted to be unfolded in order to form a corral area adjacent said vehicle and connected to said opening of said vehicle;

c. means for holding at least one of said units in folded position so that said unit may be swung outwardly from said vehicle on its pivot to said vehicle in order to give access to said door; and d. a mounting bracket connected to the opposite sides of said vehicle and to which said foldable corral units are pivotally connected and in which the means for holding the unit in folded position consists of a holding bracket pivoted to said mounting brackets on substantially the same pivot axis as said foldable corral unit so that when said holding bracket is in holding position the folded sections of said unit and said bracket may be swung on the same axis.

5. In a combination of the class described:

a. a vehicle adapted to carry animals having an ingress and egress opening and having wheel wells on each side thereof;

b. two foldable corral-forming units, one pivoted on each side of said opening, each of said units having a plurality of fence sections hingedly connected together and adapted to fold along the side walls of said vehicle, said fence sections also being adapted to be unfolded in order to form a corral area adjacent said vehicle and connected to said opening of said vehicle; and c. said sections of said foldable corralunits having a lower bar which may be moved to a raised position so that when said units are in folded position the sections will be clear of said wheel wells, said lower bars having ring means surrounding the vertical legs of said sections and are freely vertically movable thereon, and in which there is stop means for determining the lower positions of said movable bars, and in which means is provided for holding said movable bars in raised position so that when the units are folded said movable bars will occupy positions above the wheel wells of said vehicle.

6. In a combination of the class described:

a. a vehicle adapted to carry animals having side walls and a rear wall having an ingress and egress opening therein;

b. bracket means mounted on said vehicle and extending outwardly and sidewardly therefrom, said bracket means being positioned near the corners where said side walls and rear walls meet, said bracket means having pivot means positioned sidewardly and outwardly so as to be spaced from said side walls; and c. two foldable corral-forming units, each having a plurality of fence sections, one of which is pivoted on one of said pivot means of said bracket means said fence sections being hingedly connected together and adapted to fold forwardly on said pivot means along said side walls of said vehicle when said vehicle is being transported from place to place or when said corral-forming units are not in use to form a corral, said fence sections being adapted to be swung outwardly and rearwardly around said pivot means of said bracket means and unfolded in order to form a corral area adjacent the rear of said vehicle and connected with said opening in said rear wall.

7. In a combination of the class described:

a. a vehicle adapted to carry animals having side walls and a rear wall having an ingress and egress opening therein;

b. pivot means on said vehicle positioned at the rearward ends of said side walls near the corners where said side walls and rear walls meet, said pivots being positioned sidewardly outwardly from said side walls;

c. two foldable corral-forming units, each pivoted on one of said pivot means, each of said corral-forming units having a plurality of fence sections hingedly connected together and adapted to fold forwardly on said pivot means along said side walls of said vehicle, extending forwardly along said side walls and being in such folded position when said vehicle is being transported from place to place or when said corral-forming units are not in use to form a corral, said fence units being adapted to be swung outwardly and rearwardly around said pivot means and unfolded in order to form a corral area adjacent the rear of said vehicle and connected with said opening in said rear wall; and d. each of said corral-forming units comprises a first section pivoted to said pivot means, an intermediate section pivoted to said first section, and an end section pivoted to said intermediate section and in which the three sections when folded are arranged with the end section being positioned between said first section and said intermediate section.

* * * * *